United States Patent [19]

Greever

[11] 3,760,481
[45] Sept. 25, 1973

[54] METHOD OF MAKING SOLDERED JOINTS
[75] Inventor: James E. Greever, Dewitt, N.Y.
[73] Assignee: Carrier Corporation, Syracuse, N.Y.
[22] Filed: Aug. 8, 1972
[21] Appl. No.: 278,846

[52] U.S. Cl............ 29/157.3 R, 29/157.6, 29/470.1, 29/492, 29/503, 228/1, 228/36, 228/40
[51] Int. Cl........................ B21d 53/02, B23p 15/26
[58] Field of Search.................. 29/470.1, 492, 503, 29/157.3 R, 157.6; 228/1, 36, 37, 40; 156/73; 118/400, 423

[56] References Cited
UNITED STATES PATENTS
| 3,277,566 | 10/1966 | Christensen | 228/37 X |
| 3,543,383 | 12/1970 | Freeman et al. | 29/470.1 |
| 3,605,255 | 9/1971 | Metzger et al. | 29/498 X |
| 3,666,520 | 5/1972 | Terai et al. | 29/492 X |
| 3,680,200 | 8/1972 | Terrill et al. | 29/503 X |

Primary Examiner—J. Spencer Overholser
Assistant Examiner—Robert J. Craig
Attorney—J. Raymond Curtin et al.

[57] ABSTRACT

A process for making a soldered joint between two members, one of which may comprise aluminum. The ends of the members to be joined are formed with sufficient clearance so that they can easily be telescoped, but preferably so that telescoping of the members forms a tight fit at a tapered neck to temporarily, frictionally retain the members in assembled relation. Prior to telescoping, either one or both of the members is coated with a layer of zinc solder so that after telescoping a layer of solder is disposed in the clearance space between the members in the region of overlap. The members are then partially submerged in a molten zinc solder bath and ultrasonic energy is applied only to the molten solder. The solder between the members is heated to its melting temperature which causes it to flow and break the surface tension at the interface with the solder bath so that solder from the solder bath flows into and completely fills the clearance space between the joint members. The ultrasonic energy can then penetrate into the region between the two members to clean the surfaces of the members without any direct contact between the ultrasonic transducer and the members being joined. When the members are withdrawn from the molten solder, the solder solidifies between them to form a permanent joint. The porcess is especially adapted for joining return bends of multi-row heat exchangers because the ends of the heat exchangers can be moved through the molten solder bath without direct contact with the ultrasonic transducers.

12 Claims, 9 Drawing Figures

PATENTED SEP 25 1973 3,760,481

METHOD OF MAKING SOLDERED JOINTS

BACKGROUND OF THE INVENTION

This invention relates to soldering metal joints. It is especially related to a process adapted for soldering return bends to the heat exchange tubes of heat exchangers wherein at least one of the members is made of aluminum.

The soldering of tubular joints, and in particular the soldering of joints where one or both of the members comprise aluminum, presents a number of special problems. Aluminum tubes normally have a tenacious oxide coating which prevents a good soldered joint being made unless the oxide is first cleaned off and not allowed to re-form while the joint is being soldered. Further, the zinc solder employed in forming an aluminum joint has much higher surface tension than typical copper brazing material and therefore does not flow readily into small spaces.

One method of obtaining good adherence between the solder coating and the aluminum is to apply ultrasonic energy to the aluminum members while they are submerged in a bath of molten solder. This technique can be used for making a bell and spigot joint between the aluminum members by directly vibrating the telescoped members in a molten zinc solder bath. Unfortunately, however, this process is excessively cumbersome for production of multiple row heat exchanger return bend joints because each of the return bend members must be individually brought into contact with an ultrasonic transducer in order to form a satisfactory joint. The process, consequently, requires excessively expensive tooling for use on a production basis.

Another technique which has been found to be successful for joining aluminum members involves forming the members to be joined in a bell and spigot relationship such that the members have an interference fit with each other. The precoated members are then simultaneously heated and forced into one another to form a joint. While this process has been successful in joining individual tubes to each other, it has serious shortcomings for a production operation. Complex fixturing is required because of the extremely accurate alignment necessary to simultaneously force a plurality of interfering return bend members into the ends of the heat exchange tubes of the heat exchanger. Also, it is difficult and expensive to manufacture both the belled ends of the heat exchange tubes and the spigot members with sufficiently great dimensional accuracy to provide the required interference fit. It is therefore desirable to employ large clearances in the joint for economical production. However, the use of large clearances has previously resulted in unsatisfactory joints when using prior aluminum soldering processes unless ultrasonic energy was directly applied to the joint as explained above.

Prior attempts at joining multi-row aluminum return bend members of heat exchangers by applying the ultrasonic energy directly to the solder bath rather than to the individual members have been generally unsuccessful because of the difficulty in transferring sufficient energy into the solder to provide the required cleaning of oxides from all of the members. Furthermore, it is undesirable to use high intensity ultrasonic energy because it adversely affects the life of the ultrasonic horn and it erodes and destroys the metal walls of the members being joined.

Applicant has discovered that a principal reason for the failure of prior attempts to join aluminum members submerged in molten zinc solder by application of ultrasonic energy to the solder alone is probably due to the inability of the ultrasonic energy to adequately penetrate into the region between the members being joined to provide the required cleaning action. This, in turn, is believed to be due to the inability of the solder to flow into and completely fill the area between the joint members because of the existence of a relatively high surface tension at the interface of the joint with the molten zinc solder.

SUMMARY OF THE INVENTION

In accordance with this invention, it has been found that telescoped aluminum members having a substantial clearance can be joined by applying ultrasonic energy to only the molten zinc solder bath if a layer of zinc solder is present initially between the members being joined. The solder layer is heated in the solder bath and is caused to melt in a manner to break the surface tension with the molten solder, thereby enabling solder from the bath to flow into and fill the space between the members being joined. This, in turn, enables the ultrasonic energy to penetrate into the space between the members to effectively clean their surfaces so that a good solder bond is achieved.

One, or preferably both, of the members to be joined is coated with a layer of adherent solder and the members are telescoped so that the solder layer lies between them. The members are then partially submerged in molten solder with the outer member opening downwardly, and ultrasonic energy is applied to only the molten solder. When the solder between the members being joined melts, it comingles with the molten solder in the bath and breaks the surface tension at the region of the joint entrance, thereby allowing the clearance space between the members to become completely occupied with liquid solder by capillary action. When this region fills with solder, the ultrasonic energy penetrates between the members with sufficient intensity to clean the inner surfaces of the members and provide an adherent coating of solder which forms a permanent joint when the members are withdrawn from the solder bath and the solder is cooled.

This process is especially adapted for commercial production of aluminum multi-row heat exchangers having aluminum return bends. Preferably, the return bends are inserted into belled ends of the tubes of the heat exchanger, so that the return bends are temporarily, frictionally secured to a tapered neck portion on the heat exchange tube bells during subsequent processing. Since the members being joined need not be directly contacted by the ultrasonic transducers, all of the return bend joints of a multiple row heat exchanger can be made by simply dipping the assembled heat exchanger into the solder bath and removing it in a continuous operation.

DESCRIPTION OF THE PREFERRED EMBODIMENT

Figure 1:
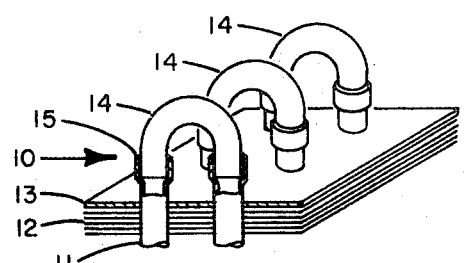
FIG. 1 is a fragmentary view partially in cross section of a typical heat exchanger having return bend joints made in accordance with this invention.

Referring to FIG. 1, there is shown a heat exchanger 10 having a plurality of rows of parallel heat exchange tube members 11. In the heat exchanger illustrated, a plurality of plate fins 12 are disposed between a pair of tube sheets 13 (only one of which is shown) to form a plate fin heat exchanger. A plurality of return bend members 14 are inserted in bells 15 formed in the end of heat exchange tubes 11. The heat exchanger illustrated is of the type wherein return bends 14 lie in a plurality of spaced parallel planes. While a two row deep heat exchanger is illustrated, various other multi-row heat exchangers with parallel or non-parallel return bends may be made in accordance with the method described herein.

Figure 3:
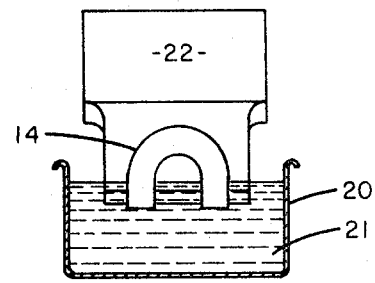
FIG. 3 is a cross sectional view taken substantially on line III—III of FIG. 2.
Figure 2:
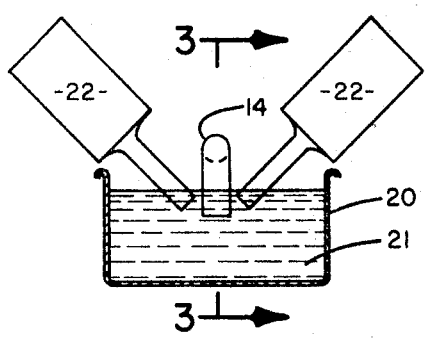
FIG. 2 is a cross sectional view illustrating the coating of a return bend with solder.

Referring now to FIG. 2, there is illustrated a solder pot 20 having a quantity of molten zinc solder 21 therein, which forms a molten solder bath. A pair of ultrasonic transducers 22, including horns, which may be of any conventional type, supply ultrasonic energy to solder 21. A return bend 14 to be coated with solder is dipped in solder bath 21, as best shown in FIG. 3, and ultrasonic energy is simultaneously imparted to the solder bath. The application of ultrasonic energy to a solder bath causes an erosion which removes the oxide from the exterior of return bend 14 and causes fusion to occur as the result of direct contact between the solder and the bare metal of the return bend. When return bend 14 is removed from the solder bath, an adherent coating of solder 25 quickly solidifies as the return bend is cooled by contact with ambient air. The layer 25 of solder is preferably about 0.001 inch thick and may be applied to either the spigot or bell members or preferably to both. To obtain a good joint, it is necessary for an adherent solder coating to be provided on at least one and preferably both of the members being joined so that it lies between the members during processing in solder pot 30. Actually, it is preferred to coat both the bell members on their interior surfaces and the return bends on their exterior surfaces with solder for best results in obtaining a good return bend joint.

Figure 4:
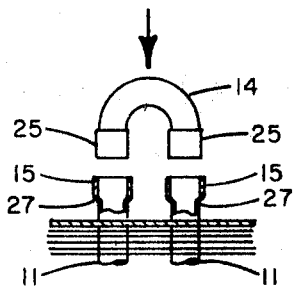
FIG. 4 is a view illustrating the assembly of a return bend with the heat exchange tubes.

As shown in FIG. 4, return bend 14, having a layer of zinc solder 25 thereon, is inserted into the belled ends of heat exchange tubes 11. Preferably, heat exchange tubes 11 are formed with bells 15, having a tapered neck portion 27, having an inner diameter at some point which is less than the outer diameter of return bend 14. The tapered neck portion 27 is accordingly formed so as to cause a tight fit with the end of return bend member 14 at some point in the bell when the return bend is inserted into the ends of heat exchange tubes. It is desirable that the parent metal of return bend member 14 form a close fit with the metal of bell 15 in the region of neck 27, irrespective of solder coating 25, so that the return bend will be temporarily mechanically secured to the heat exchange tubes by a friction fit after insertion therein to facilitate subsequent processing. While it is desirable for the members to fit tightly so they are retained in assembled relation, it is also necessary that the fit is not so tight as to prevent venting of the joint during the soldering process, so the solder can enter the joint by capillary action. Likewise, substantial clearance space is required between the members over most of their area of overlap to provide a space for solder to flow in forming the finished joint. The sides of the bell preferably have a substantial initial clearance with the return bend of about 0.01 inch along most of its length, which typically may be reduced to about 0.009 inch by solder layer 25, so as to facilitate insertion of the return bends into the ends of the heat exchange tubes.

Figures 7, 8:
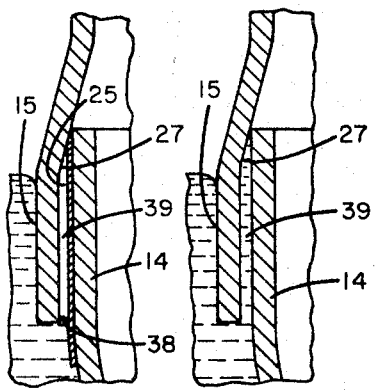
FIG. 7 illustrates the initial condition of assembled joint members after being submerged in the solder bath.
FIG. 8 illustrates the condition of the joint members after heating in the solder bath.

The temporarily assembled joint members are then lowered into a second pot 30 containing molten zinc solder to heat the adhering solder layer. FIG. 7 illustrates the condition of a return bend joint after it is initially plunged into the second solder pot. It will be seen that a distinct meniscus 38 is present at the interface of clearance space 39 with the molten solder. This figure also illustrates the engagement between the end of return member 14 and tapered portion 27 of bell 15 which temporarily frictionally retains the members in engagement but allows venting of clearance space 39 to the interior of heat exchange tube 11.

Solder layer 25 extends an axial distance on the end of return bend 14 greater than the distance of overlap between the members so that it extends below the end of bell 15. After a period of time, joint members 14 and 15 and adherent solder coating 25 are heated to at least the melting point of the solder coating. As solder layer 25 begins to melt, it wets and comingles with the molten zinc solder in the region below the end of bell 15 to break the surface tension at meniscus 38 which normally prevents the solder from flowing into clearance space 39 between the joint members. When this wetting has occurred, the molten zinc flows freely up into the clearance space between the joint members as illustrated in FIG. 8.

After solder has flowed into the clearance space, the joint is brought into an ultrasonic field within the solder bath. The solder completely filling the clearance space between the joint members provides a path for the ultrasonic energy to reach and clean the interior surfaces of the joint members. Consequently, the interior surface of bell 15 and the exterior surface of return bend 14 are scrubbed and cleaned ultrasonically so that the zinc solder can fuse with the aluminum joint members.

Figure 9:
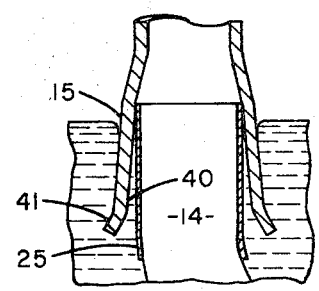
FIG. 9 is a drawing similar to FIG. 7 illustrating a modified embodiment of the joint members.

FIG. 9 illustrates a slightly modified bell construction wherein bell 15 has a more moderately tapered throat region 40 and an outwardly flaring lip portion 41. This construction is essentially adapted for use in connection with automated assembly of the components because of the ease with which the return bend members may be inserted within the valve.

Figure 5:
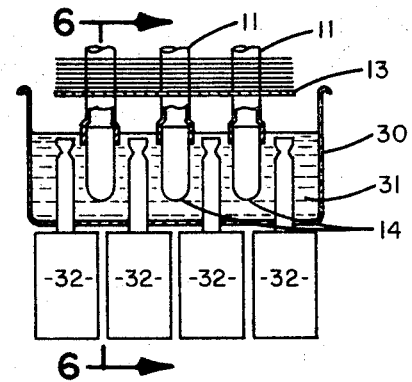
FIG. 5 is a cross sectional view illustrating a heat exchanger passing through a molten solder bath.
Figure 6:
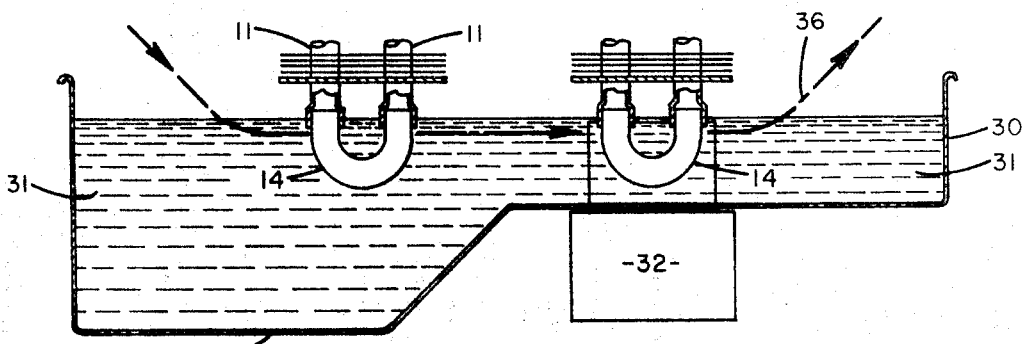
FIG. 6 is a cross sectional view taken substantially on line VI—VI of FIG. 5.

As shown in FIGS. 5 and 6, solder pot 30, having molten zinc solder 31 therein, may be provided with a specially configured array of ultrasonic transducers and horns 32. Ultrasonic transducers having horns 32 extend through the bottom of solder pot 30 upwardly toward the surface of molten solder 31. Vertically mounted horns 32 are arranged in a side by side array or in a staggered formation and are spaced from each other by a distance which will permit the movement of return bends past the horns without contact therewith.

Heat exchanger 10 having return bend members 14 termporarily secured thereto by the tight fit with bell 26 are moved along a conveyor belt so that the return bends assume a path similar to that designated by numeral 36. Path 36 lies in a plane substantially parallel with the planes of return bend members 14. The return bend members dip into solder pot 30 in a heating region 35 where they are brought up to at least the melting temperature of solder coating 35. The amount of heating is determined by the length of time the return bends reside in the heating region before reaching the region of the ultrasonic horns. Heating region 35 is preferably of enlarged volume, compared to the soldering region, to increase its heat storage capacity and improve temperature uniformity of the bath.

The heat exchanger is preferably aligned so that return bends 14 pass between adjacent ultrasonic transducers 32 in spaced relation therewith. As return bends 14 are moved to a position adjacent to the horns of transducers 32, a burst of ultrasonic energy is supplied directly to the molten solder 31 by the transducers so that the return bends lie in an ultrasonic field. The prior heating of solder layer 25 causes the pretin layer of solder on the return bends to melt and flow so that the surface tension of the solder in the solder pot is broken at the entrance to the joint clearance between the members. Solder therefore flows and completely fills the clearance space between the joint members by capillary action. Since the space between the joint members is now completely filled with solder, the ultrasonic energy applied to the solder is able to penetrate from the outer bell member into this region to ultrasonically scrub the inner joint surfaces being bonded. Prior ultrasonic processes for soldering aluminum tube joints are believed to have been unsatisfactory because the surface tension of the molten zinc solder was so great that it prevented the region between the joint members from completely filling with solder. Consequently, insufficient ultrasonic energy penetrated the void space between the members because there was insufficient solder available in the joint area to conduct the energy to achieve the required cleaning of the inner joint surfaces.

The heat exchanger is thereafter raised out of solder pot 30 and the joint cooled by contact with the ambient air. Cooling of the joint rapidly solidifies a firmly adherent coating of zinc solder between the joint members, thereby forming a permanent joint of very high quality.

Many heat exchangers are of the multiple row type wherein there are four or six rows of heat exchange tubes in the direction of air flow across the heat exchanger. With such heat exchangers, it is often preferred practice to employ multiple refrigerant circuits within the heat exchangers. Consequently, in such coils the return bends are not always all parallel with each other, but a number of them are often placed transversely to the plane of others. Consequently, the heat exchanger cannot be passed between rows of parallel transducers in the solder pot as illustrated in the drawing. In such cases, it has been found that it is possible to mount the ultrasonic transducers and horns on the bottom of the solder pot and to focus sufficient energy at the proper location in the molten solder to provide good return bend joints. The return bends are assembled with the heat exchanger tubes as previously described. The heat exchanger is then lowered into the molten solder and left there for sufficient time to melt the solder between the return bend and the heat exchange tubes, so that the surface tension is broken at the interface with the molten solder. An ultrasonic energy field is then applied to the solder to clean the surfaces of the tubes and form the final joint as described before.

In order to form a good return bend joint, the depth of submergence of the return bend in the molten solder is important. The outer member of the joint, having the greater diameter, which receives the other member, must be disposed in a downward direction in the solder bath. Furthermore, the outer member must be only partially submerged to a depth less than the extent of the penetration of the inner member into the outer member so that the surface of the molten solder is below the top of the inner member. It has been found that if the surface of the solder is above the top of the inner member, there is a tendency for the molten solder to flow up into the clearance space between the joint members and to overflow the top of the inner member, which results in excess solder accumulating in the interior of the return bend.

For a number of reasons, it is preferred that the ends of the heat exchange tubes be enlarged to form a bell which receives the straight cylindrical sides of the return bend. First, it is easy to bell the ends of the heat exchange tube members in the process of expanding the heat exchange tube into contact with the fins. Secondly, by belling the ends of the heat exchange tube members and inserting the return bends therein, only a portion of the ends of the heat exchange tubes need be submerged in the molten solder so that the fin portion of the tubes are not coated. In addition, a bending operation is all that is required to form the return bend from tubing. Also, the short return bends do not lend themselves as easily to having bells formed thereon as do the heat exchange tubes.

The tapered neck of the outer bell member can be a relatively sharp bevel as illustrated in the drawing, or the whole bell member can have a gradually tapered neck along the axial extent of the bell. In either case, the return bend can easily be assembled into the high clearance bell so as to secure it by a friction fit for subsequent lowering into the solder. As previously noted, this invention avoids the problems inherent in joining two members having a close fit along their entire length, and therefore, overcomes a significant fixturing problem in a production operation.

While this invention finds its principal application in the joining of aluminum members, it will be apparent that the process may also be employed to solder various other metals to aluminum. Accordingly, the invention may be otherwise embodied within the scope of the following claims.

I claim:

1. In a method of making a tubular joint between the ends of two tubular members, at least one of which comprises aluminum, the steps including:
    A. forming the end of said members to be joined of a size to enable the ends to be telescoped with a clearance space therebetween;

B. applying an adherent coating of solidified solder to the end of at least one of said members;

C. inserting the end of one of said members into the end of the other of said members, so that the coating of solidified solder is present in the clearance space between the overlapping portion of the ends of the inner and outer telescoped members;

D. positioning the telescoped members so that the open end of the outer of the members is disposed downwardly;

E. submerging the downwardly disposed open end of the outer of the two telescoped members into molten solder to heat the assembled members and the coating of solder therebetween to at least the melting point of the solder, and to thereby break the surface tension of the solder at the region of the joint by melting and flowing of the solidified solder coating, thereby causing molten solder to flow into and fill the region between the two members;

F. directly applying ultrasonic energy to only the molten solder while the inserted ends of the members lie in the ultrasonic energy field in the molten solder, whereby the ultrasonic energy penetrates into the clearance space between the joint members to clean the inner surfaces of the members; and G. withdrawing the members from the molten solder, and cooling them to solidify the solder in the clearance space between the members to form a joint therebetween.

2. A method as defined in claim 1 wherein the step of applying coating of solder to the end of one of said members includes submerging the end of that member in molten solder; and applying ultrasonic energy to the molten solder while the end of the member is submerged therein.

3. A method as defined in claim 1 wherein the step of inserting the end of one of the members into the end of the other of the members includes axially applying force of sufficient magnitude to the members to frictionally retain the members in assembled relation during subsequent processing.

4. A method as defined in claim 1 wherein the step of forming the ends of said members includes forming a bell with a tapering portion on one of the members, said tapering portion having an interior dimension smaller than the corresponding exterior dimension of the other of said members; and wherein the step of inserting the end of the other of said members into the bell formed on said one member includes forcing the members together so as to frictionally retain the members in assembled relation during subsequent processing.

5. A method as defined in claim 1 wherein the step of applying an adherent coating of solder to at least one of said members includes applying said adherent coating to the end of the inner of said members an axial distance greater than the area of overlap between the members when they are assembled so that the solder coating extends downwardly from the downwardly disposed open end of the outer member when the assembled members are submerged in molten solder, to thereby afford a region of substantial area for comingling of the heated coating of solder and the molten solder surrounding it, facilitating breaking of the surface tension of the molten solder at its interface with the clearance space between the joint members.

6. A method as claimed in claim 1 wherein the step of submerging the inserted ends of the members into molten solder includes disposing the bottom end of the outer of the inserted members below the surface of the molten solder while the upper end of the inner of the inserted members lies above the level of molten solder.

7. In a method of joining a plurality of return bend members to the ends of a plurality of heat exchange tube members of a heat exchanger, wherein the ends of said tube members are formed of sufficient size to receive the ends of said return bend members with a clearance space therebetween, the steps including:

A. applying an adherent coating of solder to the ends of at least one of said members;

B. inserting and temporarily securing the ends of the return bend members into the ends of the heat exchange tube members with the adherent layer of solder disposed in the clearance space between the overlapping ends of said members, thereby providing a plurality of return bends assembled with the heat exchanger;

C. positioning the heat exchanger so that ends of the heat exchange tube members open downwardly;

D. lowering the ends of the heat exchange tube members, having the return bend members inserted therein, into molten solder to heat the adherent layer of solder to its melting point, whereby the melting of the adherent coating of solder breaks the surface tension of the molten solder at the region of the inserted ends of the members so that molten solder is enabled to flow into the clearance space between the inserted ends of the members;

E. applying ultrasonic energy to only the molten solder while the inserted ends of the members lie in the ultrasonic energy field in the molten solder, whereby the ultrasonic energy penetrates into the clearance space between the joint members to clean the inner surfaces thereof; and F. withdrawing the heat exchanger from the molten solder and cooling it to solidify solder in the clearance space between the heat exchange tube and the return bend members and form a permanent joint therebetween.

8. A method as defined in claim 7 including the step of forming a bell on the ends of said heat exchange tube members with a tapering portion, said tapering portion having a portion having an interior dimension smaller than the corresponding exterior dimension of the other of said members; and wherein the step of inserting the end of the return bend members into the bells formed on said heat exchange tube member includes forcing the members together so as to frictionally retain the members in assembled relation during subsequent processing.

9. A method as defined in claim 7 wherein the step of applying an adherent coating of solder to at least one of said members includes applying said adherent coating to the end of the inner of said members an axial distance greater than the area of overlap between the members when they are assembled so that the solder coating extends downwardly from the downwardly disposed open end of the outer member when the assembled members are submerged in molten solder, to thereby afford a region of substantial area for comingling of the heated coating of solder and the molten solder surrounding it, facilitating breaking of the surface tension of the molten solder at its interface with the clearance space between the joint members.

10. In a method of joining a plurality of return bend members to the ends of a plurality of heat exchange tube members of a heat exchanger having multiple parallel rows of heat exchange tubes, wherein the ends of said tube members are formed of sufficient size to receive the ends of said return bend members with a clearance space therebetween, the steps including:

A. applying an adherent coating of solder to the ends of at least one of said members;

B. inserting and temporarily securing the ends of the return bend members into the ends of the heat exchange tube members, with the adherent layer of solder disposed in the clearance space between the overlapping ends of said members, thereby providing a plurality of return bends assembled with the heat exchanger which lie in parallel planes;

C. positioning the heat exchanger so that ends of the heat exchange tube members open downwardly;

D. lowering the ends of the heat exchange tube members, having the return bend members inserted therein, into molten solder to heat the adherent layer of solder to its melting point, whereby the melting of the adherent coating of solder breaks the surface tension of the molten solder at the region of the inserted ends of the members so that molten solder is enabled to flow into the clearance space between the inserted ends of the members;

E. passing the ends of the heat exchange tube members, having return bend members inserted therein, along a path parallel with the planes of said plurality of return bends, past a plurality of ultrasonic transducers disposed in the molten solder, so that the return bends pass between adjacent ultrasonic transducers in spaced relation therewith;

F. applying ultrasonic energy to only the molten solder while the inserted ends of the members lie in an ultrasonic field in the molten solder, whereby the ultrasonic energy penetrates into the clearance space to clean the inner surfaces of the members; and G. withdrawing the heat exchanger from the molten solder and cooling it to solidify solder in the clearance space between the heat exchange tube and return bend members and form a permanent joint therebetween.

11. A method as defined in claim 10 including the step of forming a bell on the ends of said heat exchange tube members with a tapering portion, said tapering portion having a portion having an interior dimension smaller than the corresponding exterior dimension of the other of said members; and wherein the step of inserting the end of the return bend members into the bells formed on said heat exchange tube member includes forcing the members together so as to frictionally retain the members in assembled relation during subsequent processing.

12. A method as defined in claim 10 wherein the step of applying an adherent coating of solder to at least one of said members includes applying said adherent coating to the end of the inner of said members an axial distance greater than the area of overlap between the members when they are assembled so that the solder coating extends downwardly from the downwardly disposed open end of the outer member when the assembled members are submerged in molten solder, to thereby afford a region of substantial area for comingling of the heated coating of solder and the molten solder surrounding it, facilitating breaking of the surface tension of the molten solder at its interface with the clearance space between the joint members.

* * * * *